`United States Patent Office`

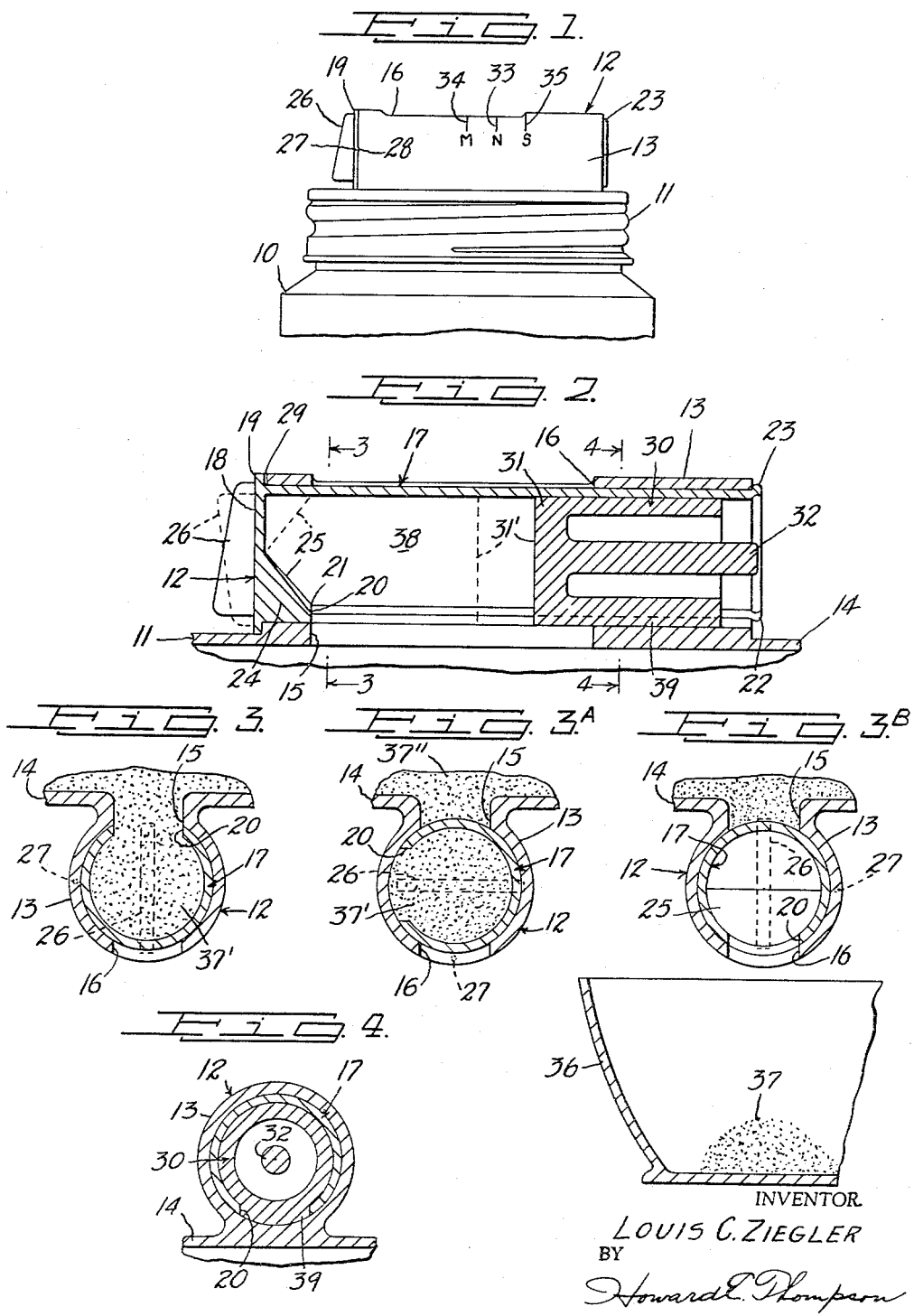

3,169,668
Patented Feb. 16, 1965

3,169,668
DEVICE FOR DISPENSING A MEASURED
QUANTITY OF INSTANT COFFEE
Louis C. Ziegler, 5 Skyline Drive, Englewood Cliffs, N.J.
Filed Aug. 19, 1963, Ser. No. 302,793
7 Claims. (Cl. 222—50)

This invention relates to containers for storing a powdered or granular substance, such as instant coffee, and to provision on the cover or closure for such container of means for adjustably measuring and then dispensing the measured quantity of the container's contents, for example, in measuring a predetermined quantity of instant coffee for dispensing into a cup in preparing a cup of instant coffee.

More particularly, the invention deals with a device of the character described, wherein manually operated means is employed for adjusting the amount of instant coffee measured in the device, preparatory to discharging the same from the device.

The novel features of the invention will be best understood from the following description, when taken together with the accompanying drawing, in which certain embodiments of the invention are disclosed and, in which, the separate parts are designated by suitable reference characters in each of the views and, in which:

FIG. 1 is a diagrammatic side view of the upper portion of an instant coffee container, with the closure cap of the container in operative position and showing a side view of one of my improved devices.

FIG. 2 is an enlarged longitudinal sectional view through the device and illustrating only part of the top wall of the cover of the container.

FIG. 3 is a partial section on the line 3—3 of FIG. 2, with the container in inverted position, showing the step of filling the storage and measuring chamber of the device.

FIG. 3A is a view, similar to FIG. 3, showing the measuring element of the device in a position at right angles to FIG. 3, with the measured amount of material contained in the element.

FIG. 3B is a view, similar to FIG. 3, showing the element of the device in the dispensing position and diagrammatically illustrating part of the cup, with the contents of the element dispensed into the cup; and FIG. 4 is a section on the line 4—4 of FIG. 2 with the cover of the container in normal upright position.

In illustrating one adaptation and use of my invention, I have indicated in FIG. 1 of the drawing diagrammatically part of the upper portion of an instant coffee container 10, having a threaded closure cap 11. Fixed to the cap or formed integrally at the top wall thereof is one of my improved measuring and dispensing devices 12, generally in the form of an elongated cylinder. In the showings in FIGS. 2 to 4, inclusive, the cylinder 13 of the device is illustrated as being integral with the top wall 14 of the cover 11. It will be understood, however, that the cylinder 13 can be independently formed and suitably secured to the top wall 14. However, said top wall will, at all times, have a discharge opening or passage 15 therein, as clearly illustrated in FIG. 2 of the drawing. The cylinder 13 will have an opening registering directly with the opening 15 and, in the integral showing in FIGS. 2 to 4, the one reference character will designate both of said openings. At 180° to the opening 15, the cylinder 13 has a similarly alined opening or passage 16, which forms the discharge opening of the device.

From a consideration of FIGS. 1 and 2 of the drawing, it will appear that the cylinder 13 is contained well within boundaries of the cover 11, as well as other associated parts of the device, later described. The cylinder 13 is open at both ends and mounted in the cylinder is a measuring element 17 in the form of an elongated sleeve, having a head 18 at one end, flanged, as seen at 19, to overlie the adjacent end of the cylinder 13. The element 17 has a longitudinal slit, opening or passage 20, which starts from a position adjacent but inwardly of the head 18, as seen at 21 in FIG. 2 of the drawing, and extends through the other end of 17, as seen at 22 in said figure. This construction forms of the element 17 a split sleeve, which will fit snugly in the cylinder 13 and the last named end portion of the element 17 has an outwardly pressed circumferential beaded portion 23 adapted to engage the adjacent end of the cylinder 13 in retaining the element 17 against displacement from the cylinder while, at the same time, permitting periodic detachment of the element 17 from the cylinder for cleaning or other purposes. Considering FIG. 2 of the drawing, it will appear that, between the inner end 21 of the slot or opening 20 and the inner surface of the head 18, is formed an enlargement 24 on one half only of the element 17, the enlargement having an inner bevelled wall 25, which will permit complete discharge of the measured material from the element and the device when the element 17 is in the position shown in FIG. 3B, in which figure, the surface 25 is shown in its lowered position, or the position indicated in dotted lines in FIG. 2.

Projecting from the outer surface of the head 18 is a fingerpiece rib 26, by means of which the element 17 can be rotated from the position shown in FIGS. 2 and 3 to the positions indicated in FIGS. 3A and 3B. The inner surface of the flange 19 of the element 17 will have a slightly projecting detent, diagrammatically illustrated in FIG. 1 at 27 adapted to engage three recesses on the adjacent end of the cylinder 13, one of these recesses being indicated at 28 in FIG. 1 and another diagrammatically shown at 29 in FIG. 2. The three different positions of the element 17 are noted by dotted illustrations of the detent 27 in FIGS. 3, 3A and 3B. It will, of course, be apparent that four of the recesses, as at 28, 29, could be employed, so that the element 17 could be rotated in either direction and still bring the same into the relative position shown in FIGS. 3, 3A and 3B.

At 30 I have shown a manually adjustable plug operating in the open end portion of the element 17, the plug 30 being generally cup-shaped in form, in other words, having an inner closed end 31, from which extends a rod-like fingerpiece 32, preferably projecting beyond the open end of the plug, as clearly noted in FIG. 2 of the drawing. It is also preferred that the periphery of the cylinder 13 will have a plurality of gauge marks thereon, as indicated at 33, 34 and 35, these marks respectively having the symbols M, N and S associated therewith, N denoting normal, M denoting mild and S denoting strong, the inner closed end 31 or the surface 31' thereof being brought into registration with these gauges in setting the plug 30 to the desired measuring position. This adjustment is performed when the element 17 is in the position shown in FIG. 3B and the aperture 20 is registering with the aperture 16 of the cylinder 13, this giving clear vision to the end 31' of the plug. In FIG. 2, the end 31' is registering with 33; whereas, when this end is moved into the dotted line position in FIG. 2, it will be registering with 34 or M and, in the strong position of the plug, it will be registering with 35 or S, which is in alinement with the righthand end of aperture 16, as shown in FIGS. 1 and 2 of the drawing.

To diagrammatically illustrate the method of procedure and the end result accomplished, I have indicated in FIG. 3B of the drawing a partial sectional view through a coffee cup 36, with the deposited instant coffee diagrammatically seen at 37. At this time, it will be pointed out that, after the measured quantity of coffee has been deposited, as seen in FIG. 3B, the element 37 will then be rotated into the position shown in FIG. 3A, assuming that no further measuring and dispensing is required and, when in this position, no instant coffee will be in the measuring chamber 38, FIG. 2 of the device. However, in FIG. 2, the element 17 is illustrated in full lines as having been moved into the position shown in FIG. 3 of the drawing, so that, by inverting the container, the instant coffee will be dispensed into the chamber 38, as diagrammatically illustrated by the deposit of coffee shown at 37' in FIG. 3. Then the element 17 is rotated and can be first brought into the position shown in FIG. 3A, where the measured quantity of the instant coffee has been separated from the coffee in the container, the latter being indicated, in part, at 37" in said figure. This position can be assumed in handling or moving the container 10 about until it is desired to dispense the measured instant coffee 37' into a cup, as diagrammatically seen in FIG. 3B, and this is accomplished by rotating the element 17 into the position shown in FIG. 3B or, in other words, at 180° to the position shown in FIG. 3, or 90° to the position shown in FIG. 3A. The two extreme positions of the element 17 are illustrated diagrammatically by the full and dotted line showing of 24 and 26 in FIG. 2 of the drawing. The plug 30 can be formed of any desired material and will, at all times, have a frictional engagement with the bore of the element 17 and it will be further noted from a consideration of FIGS. 2 and 4 of the drawing that the plug includes a projecting rib portion 39 extending the full width of the slot or aperture 20 and the full length of the cylinder portion of the plug. This keys the plug against rotation and at the same time keeps the slot or aperture 20 clear, particularly in adjustment of the plug 30 into its several positions of adjustment. It will also be apparent that, when 24 is in the dotted line position of FIG. 2 or the position shown in FIG. 3B, the angular surface 25 would serve to fully dispense all of the instant coffee measured in the chamber 38 of the element 17. This surface 25 extends to the lefthand end portion of the aperture 16 in the cylinder 13, as will clearly appear from a consideration of FIG. 2 of the drawing.

Having fully described my invention, what I claim as new and desire to secure by Letters Patent is:

1. The combination with a container having a closure cap, of a device on the cap for measuring a predetermined quantity of the contents of said container and then dispensing said measured quantity from said device, said device comprising an elongated cylinder on the cap and a passage in the cap adapted to communicate the cylinder with the interior of said container in connection with which the cap is mounted, the cylinder having a discharge passage circumferentially spaced with respect to said first named passage, the discharge passage being of the same width and length as said first named passage, an element rotatably mounted in the cylinder, said element having an elongated cylindrical bore opening through one end of said element, a single slit extending longitudinally of the element to said open end, at least part of said slit forming a passage adapted to register with both of said first named passages in two different rotatable positions of the element in said cylinder, and a cup-shaped plug having an inner closed end movable longitudinally in said element for controlling the size of a measuring chamber formed in said cylindrical bore, whereby a measured amount of material disposed in the measuring chamber can be dispensed through the discharge passage of said cylinder in rotation of said element.

2. A device as defined in claim 1, wherein the open end of said element includes a circumferential bead engaging the cylinder in retaining the element against displacement from the cylinder.

3. A device as defined in claim 1, wherein said cup-shaped plug includes a projecting rib fitting snugly in the slit of said element to key said member against rotation in the element and to at all times clear the slit in said element of material being measured and dispensed.

4. A device as defined in claim 1, wherein said measuring chamber is partially formed by a head at one end of said element, and said cup-shaped plug includes a fingerpiece exposed through the open end of said element and said plug for manual adjustment of said plug.

5. A device as defined in claim 4, wherein the cylinder includes longitudinally spaced markings registering with said discharge passage, and the closed end of said plug cooperating with said markings when the slit of said element registers with the discharge passage in controlling different capacities of the measuring chamber.

6. A device as defined in claim 4, wherein the inner surface of the head of said element includes a bevelled portion facilitating complete discharge of the measured material from said measuring chamber.

7. A device as defined in claim 4, wherein the head end of said element includes on the outer surface thereof a fingerpiece portion facilitating manual rotation of said element, said head end of the element having an annular flange, and said flange and the adjacent end of the cylinder having cooperating means retaining said element in different rotated positions in said cylinder.

References Cited by the Examiner
UNITED STATES PATENTS

| | | | |
|---|---|---|---|
| 1,618,363 | 2/27 | Clark | 222—44 X |
| 2,176,222 | 10/39 | McGowan | 222—49 X |
| 2,354,477 | 7/44 | Radbruch | 222—158 |
| 2,401,684 | 6/46 | Gumilar | 222—44 X |
| 3,029,002 | 4/62 | Gregoire | 222—307 |
| 3,122,278 | 2/64 | Crozier | 222—305 |

LOUIS J. DEMBO, *Primary Examiner.*